(12) United States Patent
Gherardini et al.

(10) Patent No.: US 8,222,533 B2
(45) Date of Patent: Jul. 17, 2012

(54) LOW PROFILE PHOTOVOLTAIC (LPPV) BOX

(75) Inventors: Stephen Daniel Gherardini, Harrisburg, PA (US); Scott S. Duesterhoeft, Etters, PA (US)

(73) Assignee: Tyco Electronics Corporation, Middletown, PA (US)

( * ) Notice: Subject to any disclaimer, the term of this patent is extended or adjusted under 35 U.S.C. 154(b) by 923 days.

(21) Appl. No.: 11/865,883

(22) Filed: Oct. 2, 2007

(65) Prior Publication Data
US 2009/0084570 A1   Apr. 2, 2009

(51) Int. Cl.
*H05K 1/16* (2006.01)
(52) U.S. Cl. .......... 174/260; 439/76.1; 174/51
(58) Field of Classification Search .......... 174/260, 174/261, 51; 439/76.1; 361/825–827
See application file for complete search history.

(56) References Cited

U.S. PATENT DOCUMENTS

| 5,438,798 | A  | * | 8/1995 | Plamper et al. ............ 49/28 |
| 6,735,468 | B2 | * | 5/2004 | Treppo et al. ............ 600/547 |
| 2004/0041230 | A1 | * | 3/2004 | Oliver et al. ............ 257/502 |
| 2005/0054219 | A1 | * | 3/2005 | Werner et al. ............ 439/76.1 |
| 2005/0054244 | A1 | * | 3/2005 | Werner et al. ............ 439/682 |

FOREIGN PATENT DOCUMENTS

| DE | 10 2004 036 697 | 2/2005 |
| DE | 10 2005 022 226 | 11/2006 |
| EP | 1 777 754 | 4/2007 |

* cited by examiner

*Primary Examiner* — Yuriy Semenenko
*Assistant Examiner* — Andargie M Aychillhum

(57) ABSTRACT

A low profile photovoltaic connection system for placement in space restricted areas. The connection system includes a connection box, diodes, and heat sinks inside of the connection box. The heat sink element is maintained in contact with the diode element such that the heat sink dissipates heat externally of the junction box and the contacts are arranged with a flat surface parallel to the solar panel to reduce vertical elevation of the junction box when mounted to the solar panel.

18 Claims, 3 Drawing Sheets

LOW PROFILE PHOTOVOLTAIC (LPPV) BOX

FIELD OF THE INVENTION

The present invention is directed to a connection system for photovoltaic (PV) arrays, and more particularly to a low profile connection box in a PV connection system that provides a solution for space restricted areas.

BACKGROUND OF THE INVENTION

Photovoltaic (PV) modules, or PV arrays, produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV systems, special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected and placed between a polyvinyl plate on the bottom and a tempered glass on the top. PV cells are interconnected with thin contacts on the upper side of the semiconductor material. The typical crystalline modules power ranges from several W to up to 200 W/module.

In the case of facade or roof systems, the photovoltaic system may be installed during construction, or added to the building after it is built. Roof systems are generally lower powered systems, e.g., 10 kW, to meet typical residential loads. Roof integrated photovoltaic systems may consist of different module types, such as crystalline and micro-perforated amorphous modules. Roof-integrated photovoltaic systems are integrated into the roof, such that the entire roof or a portion thereof is covered with photovoltaic modules, or they are added to the roof later. PV cells may be integrated with roof tiles or shingles.

PV modules/arrays require specially designed devices adapted for interconnecting the various PV modules/arrays with each other, and with electrical power distribution systems. PV connection systems are used to accommodate serial and parallel connection of PV arrays. In addition to connection boxes, a PV connection system includes connectors that allow for speedy field installation or high-speed manufacture of made-to-length cable assemblies. Connection or connection boxes may be required to receive specialized cable terminations from PV modules/arrays, with power diodes inside for controlling current flow to the load. PV arrays may be required in areas with tight space restraints and requirements, requiring the size of the PV module to be minimized.

Therefore, there is a need for a low profile PV (LPPV) box that allows for the placement of PV arrays in compact areas.

SUMMARY OF THE INVENTION

The present invention is directed to a low profile PV junction box for distributing solar energy captured by the PV arrays in the solar system. The junction box has a cover portion with an opening for receiving at least one foil contact from a solar panel, a plurality of diode elements, each having a heat sink element attached for dissipating heat generated by the diode elements and a plurality of contacts configured to electrically connect to at least one foil contact from a solar panel, and a plurality of cables configured to interconnect a plurality of low profile junction boxes, and configured to conduct the energy from the solar panels. The heat sink elements are in contact with the diode elements, such that the heat sinks dissipate heat externally of the junction box and wherein the contacts are arranged with a flat surface parallel to the solar panel to reduce vertical elevation of the junction box when mounted to the solar panel.

Another embodiment of the present invention includes a low profile junction box for interconnection of solar cell arrays in a power distribution system. The junction box has a cover portion with an opening for receiving at least one foil contact from a solar panel, a diode element with a heat sink element for dissipating heat generated by the diode elements and a plurality of contacts to electrically connect to at least one foil contact from a solar panel. The junction box also has a plurality of cables to interconnect a plurality of low profile junction boxes, and to conduct the energy from the solar panels. The heat sink element is in contact with the diode element, such that the heat sink dissipates heat externally of the junction box and wherein the contacts are arranged with a flat surface parallel to the solar panel to reduce vertical elevation of the junction box when mounted to the solar panel.

An advantage of the present invention is that the low profile PV junction box allows the PV solar array to be placed in space-restricted areas.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
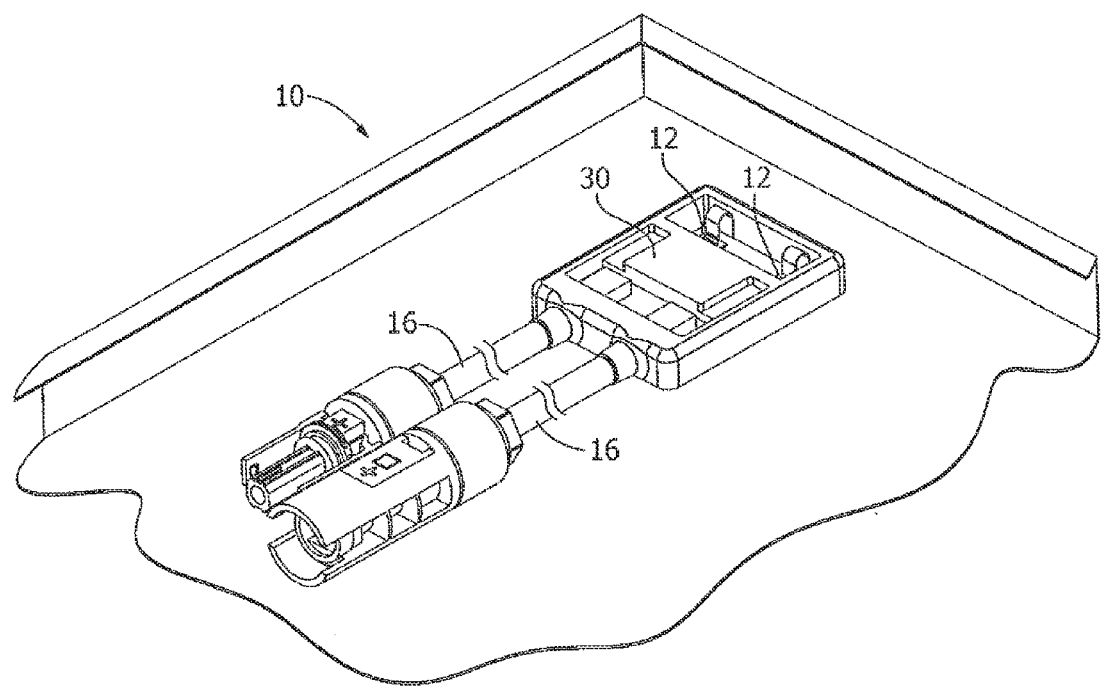
FIG. 1 illustrates a 2-position embodiment of the present invention.
Figure 2:
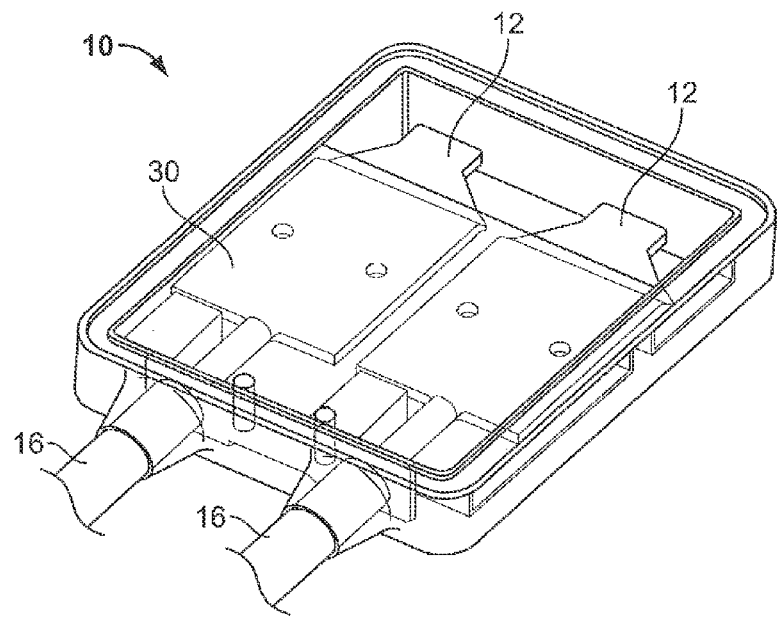
FIG. 2 illustrates a bottom view of the component circuitry of the 2-position embodiment of the present invention.
Figure 3:
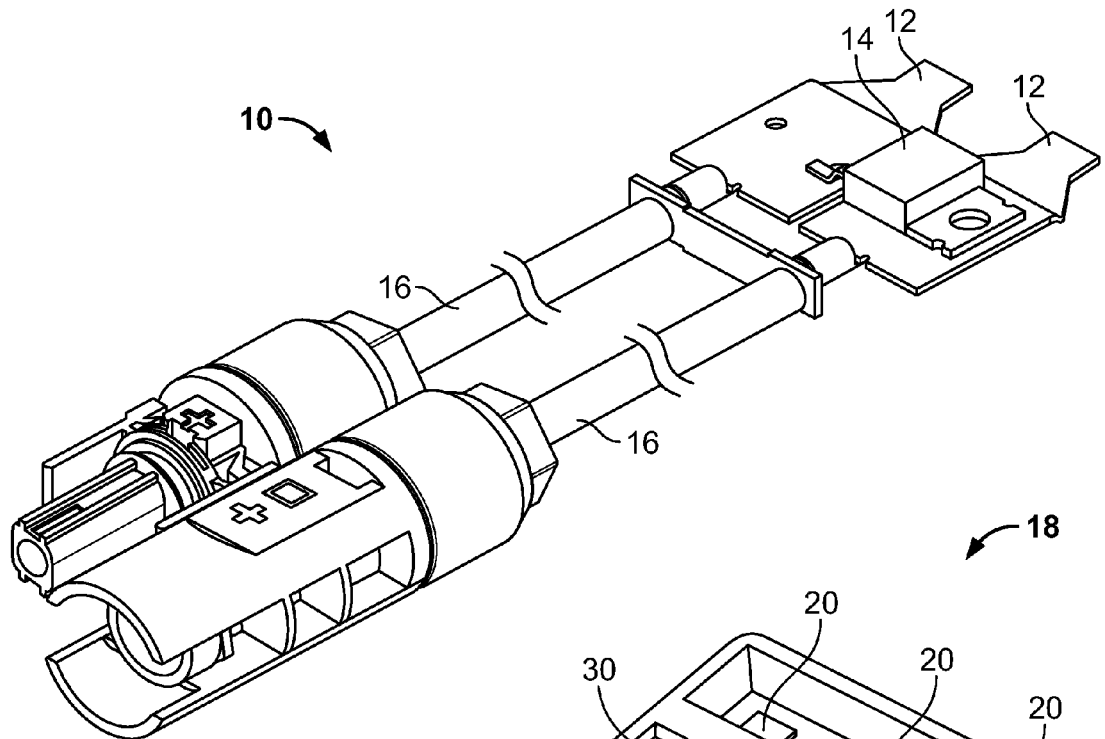
FIG. 3 illustrates a top view of the components circuitry of the 2-position embodiment of the present invention.

The present invention is directed to a low profile PV junction box for interconnection of solar cell arrays. FIGS. 1-3 illustrate the two-position embodiment of the present invention. The junction box module 10 is mounted to the backside of a solar panel (not shown) and connected to the foil contacts of the solar panel to distribute energy captured by the panel. The two-position module 10 has a cover portion 30, two contacts 12 and cable assembly 16. The module 10 is mounted to the backside of the panel and the conductive foils from the panel are soldered or otherwise attached to the contacts 12 of the module 10. The contacts are disposed horizontally in the junction box such that when applied to the solar panel, they are parallel to the conductive foils of the panel. The arrangement of the horizontal contacts allows the junction box to have a minimum vertical profile and conform to smaller spaces. A waterproof epoxy or adhesive, such as RTV silicon, is used to secure the module to the panel. The centerline spacing between the contacts 12 in the two-position module 10 is approximately 18.00 mm, however, any suitable spacing may be used.

Figure 4:
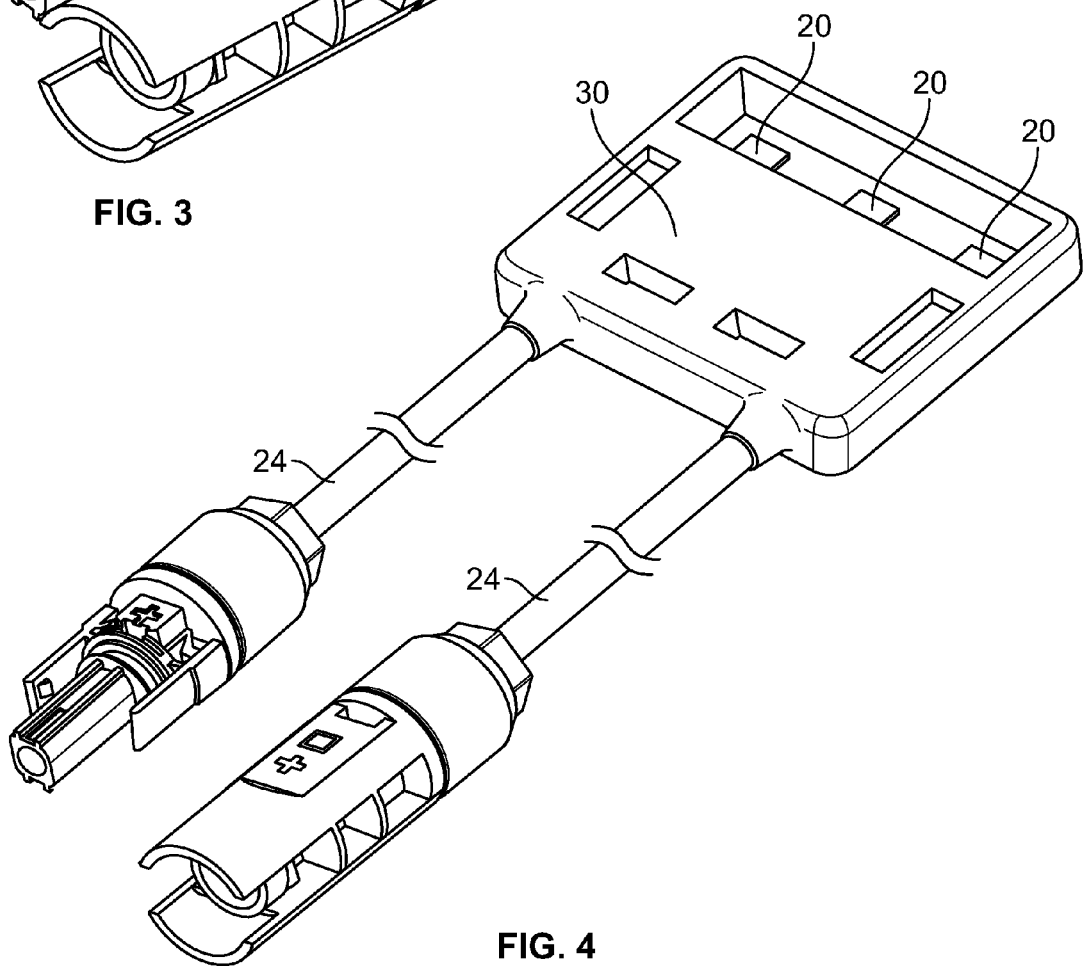
FIG. 4 illustrates a 3-position embodiment of the present invention.
Figure 5:
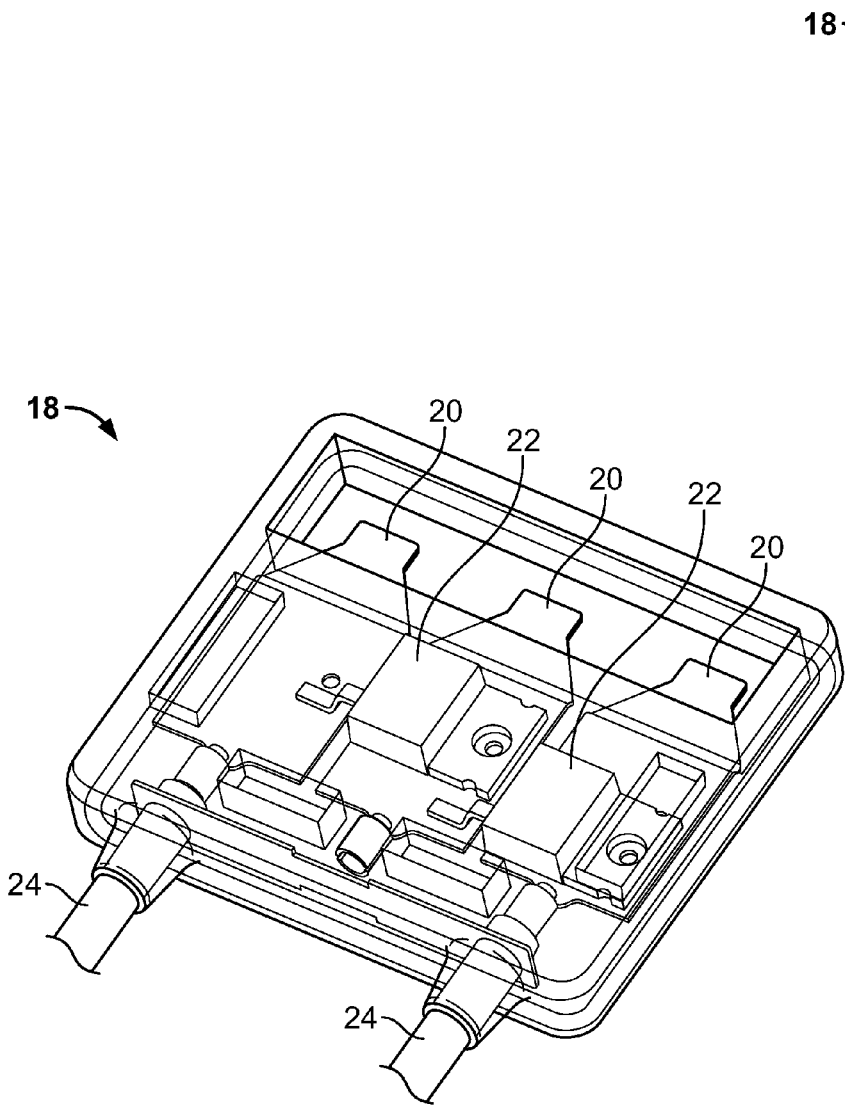
FIG. 5 illustrates a bottom view of the component circuitry of the 3-position embodiment of the present invention.
Figure 6:
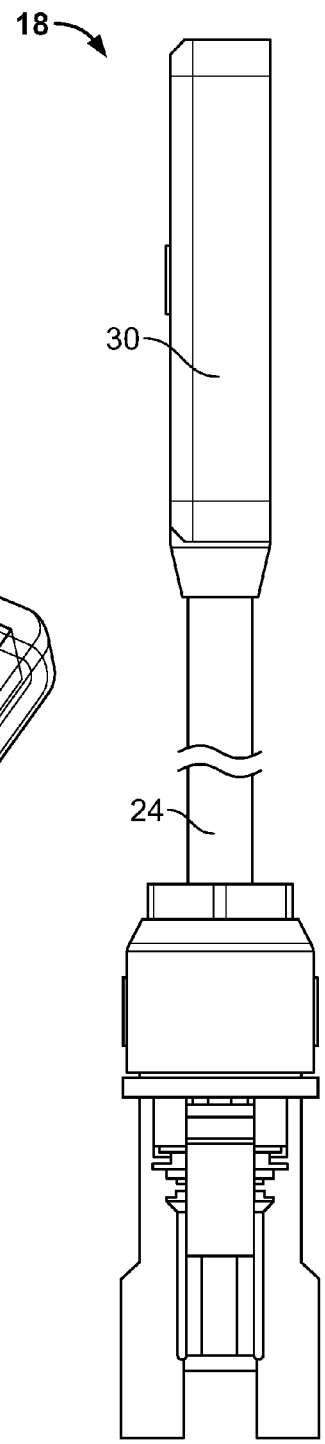
FIG. 6 illustrates a side view of the present invention.

FIGS. 4 and 5 illustrate the three-position module 18 of the present invention. The module 18 is mounted to the backside of a solar panel (not shown) to distribute energy captured by the panel. The three-position module 18 has a cover portion 30, three contacts 20, diodes 22 and cable assembly 24. The module 18 is mounted to the backside of the panel and similar to the two-position module 10, the conductive foils from the panel are soldered or otherwise attached to the contacts 20 of the three-position module. A waterproof epoxy or adhesive, such as RTV silicon, is used to secure the module to the panel. In the embodiment shown, the centerline spacing between the contacts in the three-position module 18 is approximately 36.00 mm, however, any suitable spacing may be used.

Both the two position and three position modules 10, 18 have an overmolded cover portion 30 that protects and covers the circuitry (diodes, contacts and cable ends). The cover portion 16 can be constructed of a substantially rigid, electrical insulating material, such as an ABS plastic or other suitable material. The junction box/cover material preferably has high thermal conductivity.

The diode circuitry used with the present invention can be TO-220 packaged diodes 14, 22. The TO-220 packaged diodes 14, 22 contain heat sinks that assist with dissipating heat and help to meet the temperature standard of IEC 61215 (Ed. 2) or other applicable industry standards. The present invention may also use ITO-220 diodes that have plastic covered heat sinks and help to dissipate any generated heat to meet the temperature standard. In addition to the TO-220 diode and ITO-220 diode, any other similar and suitable diode that can meet the temperature standard may be used with the present invention.

The present invention is designed to withstand an operating current of a 10 amp to 15-amp range, and a diode operating voltage of about 45 VDC maximum. The ambient operating temperature the module can withstand is −40 degrees to 75 degrees Celsius. In addition, the contacts 12, 20 are preferably tin plated phos bronze, however any suitable materials may be used, such as brass, or other types of copper alloys. The contacts 12, 20 may also be a unitary configuration with the heat sink as well.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A low profile junction box for interconnection of solar cell arrays in a power distribution system, the low profile junction box comprising:

an overmolded cover portion having an opening, the opening having a plurality of contacts extending therein, the contacts having exposed surfaces provided in the opening, the opening extending to a solar panel for receiving at least one conductive foil from the solar panel, the at least one conductive foil soldered to the exposed surfaces of the plurality of contacts in the opening, the plurality of contacts extending essentially parallel to the at least one conductive foil when the low profile junction box is mounted over the conductive foils;

a plurality of diode elements electrically connected to the plurality of contacts, each diode element having a heat sink element attached thereto for dissipating heat generated by the diode elements;

the overmolded cover portion being constructed of thermally conductive material and being overmolded over the plurality of contacts and the plurality of diode elements to provide high thermal conductivity between the plurality of contacts and the plurality of diode elements and the overmolded cover portion;

a plurality of cables configured to interconnect a plurality of low profile junction boxes, and configured to conduct the energy from the solar panels;

a waterproof adhesive which secures the low profile junction box to the solar panel; and wherein the heat sink elements being maintained in contact with the diode elements, such that the heat sinks elements dissipate heat externally of the junction box and wherein the contacts are disposed in the junction box to reduce vertical elevation of the junction box when mounted to the solar panel.

2. The junction box of claim 1, wherein the cover portion is constructed of a substantially rigid, electrical insulating material.

3. The junction box of claim 1 further comprising two diode contact positions.

4. The junction box of claim 1 further comprising three diode contact positions.

5. The junction box of claim 1, wherein at least one diode element of the plurality of diode elements being TO-220 packaged diodes, wherein the TO-220 packaged diodes have heat sink tabs for dissipating heat.

6. The junction box of claim 1, wherein at least one diode element of the plurality of diode elements being TO-220 diodes, wherein the ITO-220 diodes have plastic covered heat sinks to dissipate heat.

7. The junction box of claim 1, wherein the contacts are a copper alloy.

8. The junction box of claim 7, wherein the contacts are any one of tin plated phos bronze or brass.

9. The junction box of claim 1, further comprising a maximum operating voltage of 45 volts DC for the diode elements.

10. The junction box of claim 1 further comprising a maximum operating current of 15 amps for the diode elements.

11. The junction box of claim 1 wherein the adhesive is waterproof silicon.

12. A low profile junction box for interconnection of solar cell arrays in a power distribution system, the low profile junction box comprising:

an overmolded cover portion having an opening, the opening having at least one contact extending therein, the at least one contact having an exposed surface provided in the opening, the opening extending to a solar panel for receiving at least one foil contact from the solar panel, the at least one foil contact soldered to the exposed surface of the at least one contact in the opening, the at least one contact extending essentially parallel to the at least one foil contact when the low profile junction box is mounted over the at least one foil contact, the cover portion constructed of material having a high thermal conductivity;

a diode element having a heat sink element attached thereto for dissipating heat generated by the diode elements, the diode element being electrically connected to the at least one contact;

the overmolded cover portion being constructed of thermally conductive material and being overmolded over the at least one contact and the diode element to provide high thermal conductivity between the at least one contact and the diode element and the overmolded cover portion;

a plurality of cables configured to interconnect a plurality of low profile junction boxes, and configured to conduct the energy from the solar panels;

a waterproof adhesive which secures the low profile junction box to the solar panel; and wherein the heat sink element being maintained in contact with the diode element, such that the heat sink element dissipates heat externally of the junction box and wherein the at least one contact is disposed in the junction box to reduce vertical elevation of the junction box when mounted to the solar panel.

13. The junction box of claim 12, wherein the cover portion is constructed of a substantially rigid, electrical insulating material.

14. The junction box of claim 13 wherein the cover portion is a single molded piece.

15. The junction box of claim 12, further comprising two diode contact positions.

16. The junction box of claim 12, further comprising three diode contact positions.

17. The junction box of claim 12, wherein at least one diode element of the plurality of diode elements being TO-220 packaged diodes, wherein the TO-220 packaged diodes have heat sink tabs for dissipating heat.

18. The junction box of claim 12, further comprising a maximum operating voltage of 45 volts, and a maximum operating current of 15 amps for the diode elements.

* * * * *